March 17, 1970
T. M. VOLLMAR
3,500,585
GATE OPERATOR UNIT
Filed July 17, 1968
2 Sheets-Sheet 1
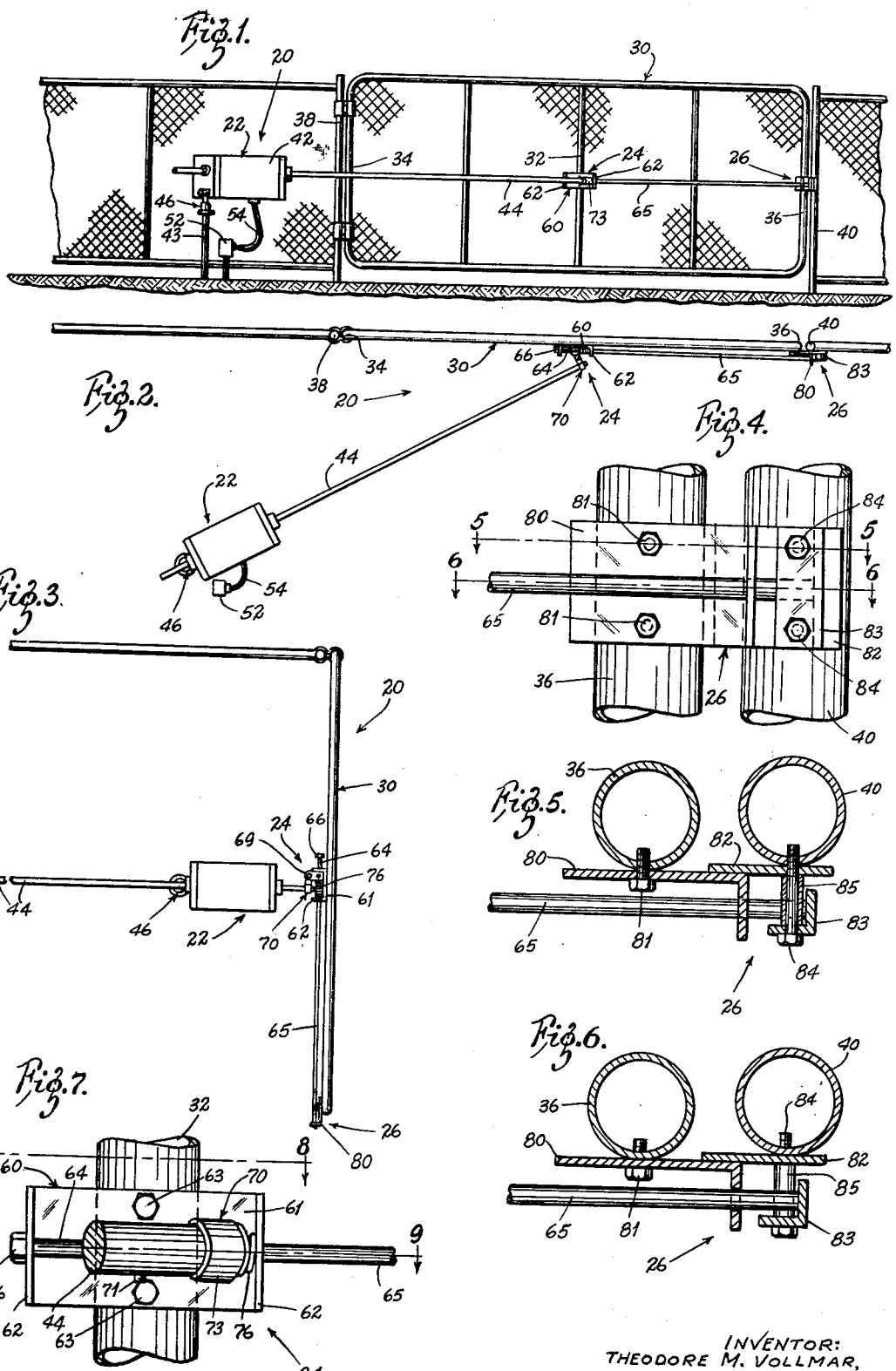
INVENTOR:
THEODORE M. VOLLMAR,
BY Kingsland, Rogers, Ezell, Eilers & Robbins
ATTORNEYS

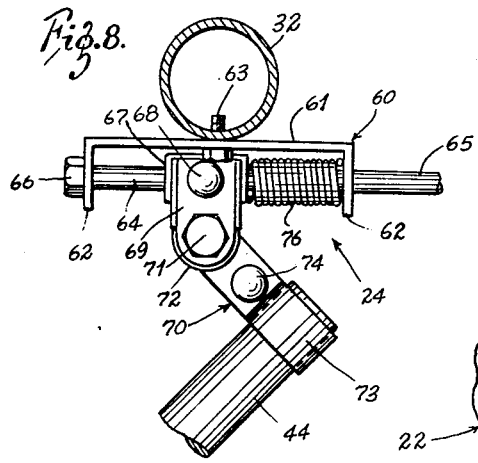

United States Patent Office 3,500,585
Patented Mar. 17, 1970

3,500,585
GATE OPERATOR UNIT
Theodore M. Vollmar, Rte. 1, Hillsboro, Mo. 63050
Filed July 17, 1968, Ser. No. 745,470
Int. Cl. E05f 15/12; E06b 11/06
U.S. Cl. 49—280                                    9 Claims

ABSTRACT OF THE DISCLOSURE

A powered mechanism for unlatching, opening, closing and latching sequentially, as required, a gate, particularly a vehicular gate, including an electric motor unit with suitable controls mounted upon a post near the associated gate when in open position, said electric motor unit having a ram or long rod extending therethrough for reciprocation thereby, a pusher and unlatcher assembly including an elongated latch rod or bolt and a spring biasing said latch rod toward open position mounted upon the gate and pivotally connected to the ram, a latching assembly mounted upon the free end of the gate and the adjacent fence post receiving the free end of the latch rod, said latch rod being movable into unlatching position with the help of the spring upon energization of the electric motor unit to withdraw the ram, the gate thereafter being pivoted to open position upon continued energization of the electric motor unit, reversal of power in the electrical motor unit effecting similarly closing and latching of the gate.

BACKGROUND OF THE INVENTION

Field of the invention

The present invention relates generally to the art of power operated gates, and more particularly to novel powered mechanism for unlatching, opening, closing and latching a gate.

Description of the prior art

Heretofore, many power actuated gates have been developed. None have been encountered in the low cost range which have given service for any reasonable length of time. Such structures have failed in the actuating mechanism, particularly in the mechanical portions. Hence, the art has long needed a power gate in the low price range which will give service over a reasonable span of time. The applicant's present powered gate structure fulfills this long need.

SUMMARY OF THE INVENTION

In brief, the present novel powered gate operating construction comprises a power unit mounted on a post and including a ram reciprocated thereby, a novel pusher and unlatcher unit for mounting on a gate and for receiving the pushing end of the ram, and a latching assembly for mounting on the gate and an adjacent gate or fence post.

Objects of the invention are to provide a novel powered mechanism for unlatching, opening, closing, and latching a gate and a novel pusher and unlatcher component which are constructed for long continued use with minimum maintenance, which will effectively and positively perform intended functions as aforesaid, which will maintain a gate latched against force applied against the same, and which otherwise fulfill the objects and advantages sought therefor.

BRIEF DESCRIPTION OF THE DRAWINGS

FIGURE 1 is an elevational view of a gate and fence with the present novel gate unlatching, opening, closing and latching mechanism applied thereto;

FIGURE 2 is a plan view thereof;

FIGURE 3 is a plan view thereof with the gate in open position, the fence segment to the right being omitted for conservation of space;

FIGURE 4 is an enlarged elevational view of the latching assembly applied to the gate and adjacent fence post, the latter and the pusher rod being broken away for conservation of space;

FIGURES 5 and 6 are horizontal cross-sectional views taken on substantially the lines 5—5 and 6—6 of FIGURE 4;

FIGURE 7 is an elevational view of the pusher and unlatcher unit mounted on a vertical member of the gate, the vertical member, the latch rod and the ram being broken away for conservation of space;

FIGURES 8 and 9 are horizontal cross-sectional views taken on substantially the lines 8—8 and 9—9 of FIGURE 7;

FIGURE 10 is a view similar to FIGURE 8, but with the gate fully open and the ram in fully retracted position, a fragment of the power unit being indicated;

FIGURES 11 and 12 are vertical cross-sectional views taken on substantially the lines 11—11 and 12—12 of FIGURE 10;

FIGURE 13 is an elevational view of the power unit supporting post, partly in section for illustration of detail and broken away for conservation of space; and FIGURE 14 is a fragmentary view showing the top of the power unit supporting post and the connection to the power unit.

DESCRIPTION OF THE PREFERRED EMBODIMENT

Referring to the drawings more particularly by reference numerals 20 indicates generally a powered gate unlatching, opening, closing and latching mechanism constructed to include the teachings of the present invention. The mechanism 20 broadly includes a power unit 22, a pusher and unlatcher assembly 24, and a latching assembly 26. The mechanism 20 is illustrated in the drawings as mounted on and in conjunction with a gate 30 having a center vertical member 32 and end vertical members 34 and 36, a first fence post 38 on which the gate 30 is hingedly mounted, and a second fence post 40 on which elements of the latching assembly 26 are mounted. Manifestly, the fence and gate may be of any desired construction besides the chain link structure illustrated.

The power unit 22 comprises a motor unit 42 and an integrated ram 44 reciprocable and locked in stopped position thereby. One such power unit 22, which can be purchased on the open market, is built for operating garage doors, etc., has a rating of 1/10 H.P., and is sold under the trademark "Perma-Power." The motor unit 42 is mounted on a post 43 conveniently by the swivel assembly 46 clearly illustrated in FIGURES 13 and 14, permitting universal movement of the motor 42 and ram 44 in the area desired. The swivel assembly 46 includes a cap member 48 pivotally connected to the motor 42, as illustrated, and threadedly engaging the end of the pin 50 extending into the post 43 for free rotative movement therein. An electrical outlet 52 of weatherproof type is located adjacent the post 43 for supplying 110 volt current to the motor 42 by grouped electrical wires 54. A momentary contact switch of conventional design is mounted upon a post at each side of the gate 30 in convenient position for use by an individual in an automobile or on foot for opening and closing the gate 30, and is electrically connected to the motor 42. Radio control means may be provided if desired, but this per se forms no part of the present invention.

The pusher and unlatcher assembly 24 is illustrated in FIGURES 1, 2 and 7–12. The assembly 24 includes a U-bracket 60 having a bight 61 and opposed legs 62, the bight 61 being secured to the gate vertical member 32 by stove bolts 63, or the like. Extending through a suitable aperture in one leg 62 is an elongated latch bolt 65 threaded into a coupling 67. An adjustable bolt 64 having a head 66 extends through the other leg 62 and is threaded into the other end of the coupling 67 limiting movement of the latch bolt 65 to the right, viewing FIGURES 7 and 8. The coupling 67 has a flat side against which is disposed one end of a short link 69, a nut and bolt assembly 68 extending through an aperture in the link 69 to maintain it in secure position, as illustrated. A collar bracket 70 is pivotally connected to the free end of the link 69 by means of a nut and bolt assembly 71 and washers 72. The looped or collar portion 73 of the collar bracket 70 is secured to the gateward end of the ram 44 by a nut and bolt assembly 74. Surrounding the latch rod 65 between the coupling 67 and the bracket leg 62 is a heavy compression spring 76 which biases the bolt 64 and latch rod 65 to the positions of FIGURE 10. In FIGURE 8, the spring 76 is shown in closed position. The operating length of the latch rod 65 is cut as necessary on the job. It is only essential that the latch bolt 65 be permitted to move far enough to effect a latching action and the spring 76 have sufficient force to retract the latch rod 65 in unlatching.

The latching assembly 26 is illustrated in FIGURES 1, 2 and 4–6, and includes a guide bracket 80 for supporting the latching end of the latch bolt 65. The bracket 80 is secured to the vertical member 36 of the gate 30 by stove bolts 81, or the like. A stop plate 82 engaged by the bracket 80 and a latch bracket 83 are secured to the fence post 40 by suitable bolts 84, sleeves 85 about the bolts 84 spacing the bracket 83 as required.

It is manifest from the foregoing description taken with the accompanying drawings that, assuming the gate 30 and the powered mechanism 20 are in the latched positions of FIGURES 1 and 2, upon a user pushing the momentary contact switch, the motor 42 is energized to retract the ram 44. As the ram 44 moves to the left in FIGURES 1, 2, pressure is released upon the compression spring 76 which moves the latch bolt 65 to the left so that the right-hand end thereof is moved clear of the latch bracket 83, thereby permitting the ram 44 to draw the gate 30 pivotally clockwise from the position of FIGURES 1 and 2 to the position of FIGURE 3, whereupon the motor 22 is automatically deenergized by standard built-in limit and reversing switch mechanism which becomes effective upon the ram 44 traveling a predetermined distance. The momentary contact switch on closing starts the motor 42, whereupon the ram 44 completes its full travel in one direction, or meets an obstacle, and in either case, the unit 22 reverses and cuts off until the next contact of the momentary contact switch. Similarly, if a user desires to close the gate 30, he simply pushes the momentary contact switch, whereupon the reverse action takes place, the ram 44 pushing the gate closed and thereafterwards latches the same by closing the coils of the spring 76 to move the latch bolt 65 into the operative position of FIGURES 4–6.

It is apparent that there has been provided a novel powered mechanism for unlatching, opening, closing and latching a gate which fulfills the objects and advantages sought therefor. The powered mechanism 20 has been shown applied to a vehicular traffic gate, but the same can be used for a cattle gate, a pedestrian gate of substantial size, and the like.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, a powered mechanism for selectively opening and closing a gate comprising motor means adapted to be pivotally mounted on a support spaced apart from a gate, a long reciprocable ram operatively integrated with said motor means for pivotal movement therewith and for reciprocation thereby, means adapted to be mounted on a gate for transmitting effective gate opening and closing forces to a gate from said motor means and ram, said last means being operatively connected to said ram to permit selective opening and closing of a gate by the ram and motor means.

2. The combination of claim 1 in which said last means includes a reciprocable latch bolt, and spring means for moving said latch bolt from locked to unlocked position following initial gate opening movement of said ram, said ram being pivotally and reciprocably connected to said latch bolt, said motor means and ram being movable as a unit arcuately as a gate is opened and closed.

3. In combination, a powered mechanism for selectively opening and closing a gate comprising power means including a reciprocable ram, means adapted to be mounted on a gate, and the like, for transmitting effective gate opening force to the gate from said power means and ram, said last means being operatively connected to said ram to permit selective opening and closing of a gate by the ram and power means, said last means including a reciprocable latch bolt, and spring means for moving said latch bolt from locked to unlocked position, said ram being pivotally connected to said latch bolt, said power means and ram being movable as a unit arcuately, said last means including a bracket mountable upon a gate, said bracket including spaced opposed legs, one of said legs slidingly supporting one end of said latch bolt, an adjustable limit bolt member connected in axial alignment to said one end of said latch bolt by a coupling member, said limit bolt member having sliding support in the other leg of said bracket and including a portion disposed to engage the outer side of said other leg to limit movement of said latch bolt towards latching position.

4. The combination of claim 3 and including a link member pivotally connected to said coupling member, and means pivotally connecting said ram to said link providing an adequate angle of movement for a gate in opening and closing.

5. The combination of claim 3 in which said spring means comprises a compression spring disposed about the latch bolt between said one leg and said coupling.

6. The combination of claim 5 in which said limit bolt member threadedly engages one end of said coupling permitting axial adjustment therebetween.

7. A pusher and unlatcher assembly comprising a bracket mountable upon a gate, said bracket including a bight and spaced opposed legs, a latch bolt having sliding support at one end in one of said legs, a limit bolt in axial alignment with said latch bolt having sliding support in said other leg, and means connecting said latch bolt and said limit bolt permitting axial adjustment therebetween.

8. The combination of claim 7 and including a compression spring about said latch bolt between said one leg and said connecting means biasing said latch bolt towards unlatched position.

9. The combination of claim 8 and including means for attachment to said connecting means of pusher means for moving said latch bolt into latched position against the bias of said spring.

References Cited

UNITED STATES PATENTS

| | | | |
|---|---|---|---|
| 2,538,980 | 1/1951 | Payne | 49—280 |
| 2,924,031 | 2/1960 | Lofts | 49—280 X |
| 3,124,344 | 3/1964 | Mano | 49—300 X |

J. KARL BELL, Primary Examiner

U.S. Cl. X.R.

49—300, 340